United States Patent [19]

Gneuss

[11] Patent Number: 5,407,586
[45] Date of Patent: Apr. 18, 1995

[54] FILTER-CHANGING METHOD FOR A MOLTEN PLASTIC FILTRATION APPARATUS

[75] Inventor: Detlef Gneuss, Bad Oeynhausen, Germany

[73] Assignee: Gneuss Kunststofftechnik GmbH, Bad Oeynhausen, Germany

[21] Appl. No.: 285,237

[22] Filed: Aug. 3, 1994

Related U.S. Application Data

[62] Division of Ser. No. 60,008, May 10, 1993, Pat. No. 5,362,223.

[30] Foreign Application Priority Data

May 11, 1992 [DE] Germany ............... 42 15 472.3
Oct. 21, 1992 [DE] Germany ............... 42 35 523.0

[51] Int. Cl.6 .................... B01D 33/00; B29C 47/68; B29B 13/10
[52] U.S. Cl. ................... 210/780; 210/790; 210/330; 425/186; 425/198; 425/199
[58] Field of Search .............. 210/780, 790, 330, 345, 210/323.2, 323.1, 234, 236; 425/183, 185, 186, 190, 197, 198, 199

[56] References Cited

U.S. PATENT DOCUMENTS

| 3,503,096 | 3/1970 | Marianelli | 425/199 |
|---|---|---|---|
| 4,167,384 | 9/1979 | Shirato et al. | 425/183 |
| 4,588,502 | 5/1986 | Zibell et al. | 425/199 |
| 4,710,288 | 12/1987 | Patrovsky | 425/197 |
| 4,814,186 | 3/1989 | Trott | 425/199 |
| 4,850,840 | 7/1989 | Gneuss | 425/199 |
| 5,090,887 | 2/1992 | Gneuss | 425/185 |

FOREIGN PATENT DOCUMENTS

| 3302343 | 8/1984 | Germany . |
|---|---|---|
| 3522050 | 10/1986 | Germany . |
| 8804007 | 6/1988 | Germany . |
| 3902061 | 2/1991 | Germany . |
| 4018310 | 5/1991 | Germany . |
| 593786 | 12/1977 | Switzerland . |

*Primary Examiner*—Frank Spear
*Assistant Examiner*—Robert James Popovics
*Attorney, Agent, or Firm*—Herbert Dubno; Andrew Wilford

[57] ABSTRACT

A filter assembly used in combination with an extruder producing a stream of pressurized molten plastic has an inlet plate formed with a Y-shaped inlet passage having a substantially circular-section upstream end adapted to receive the stream of pressurized molten plastic from the extruder. The inlet passage branches downstream of its upstream end and has a pair of downstream ends opening at substantially circular downstream ports. An outlet plate fixed immediately downstream of the inlet plate is formed with a Y-shaped outlet passage having a substantially circular-section downstream end. The outlet passage is branched symmetrically to the inlet passage upstream of its downstream end and has a pair of upstream ends opening at substantially circular upstream ports aligned with the downstream ports. A rotatable filter disk engaged between the plates is formed with a circularly annular array of substantially circular-section throughgoing holes each defining a respective substantially circular seat. The ports and holes are laterally spaced from each other such that in predetermined positions of the disk the ports open into two adjacent holes. A drive displaces the disk between respective angularly offset positions in each of which two of the holes are aligned between the ports for flow through them from the upstream ports to the downstream ports. A respective substantially circular filter unit is provided in each of the seats.

2 Claims, 7 Drawing Sheets

FILTER-CHANGING METHOD FOR A MOLTEN PLASTIC FILTRATION APPARATUS

CROSS REFERENCE TO RELATED APPLICATIONS

This application is a division of application Ser. No. 08/060,008 filed 10 May 1993, now U.S. Pat. No. 5,362,223, with a claim to the priority of German applications P 42 15 472.3 and P 42 35, 523.0 respectively of 11 May and 21 Oct. 1992.

FIELD OF THE INVENTION

The present invention relates to an injection-molding system. More particularly this invention concerns a system for filtering a molten-plastic stream and for changing the filter medium without interrupting flow in the stream.

BACKGROUND OF THE INVENTION

A filter assembly for a plastic-molding apparatus typically has an inlet plate formed with an inlet passage having an upstream end adapted to receive the stream of pressurized molten plastic from the extruder and a downstream end opening at downstream port, an outlet plate formed with an outlet passage having a downstream end and an upstream end opening at an upstream ports aligned with the downstream port. A rotatable filter disk engaged between the plates is formed with a circularly annular array of throughgoing holes each defining a respective seat and the ports and holes being laterally spaced from each other such that in predetermined positions of the disk the ports open into two adjacent holes. Each seat holds a respective filter unit normally comprises of a perforated plate having an upstream side covered by a filter medium, such as a mesh or cloth.

With such a system the filter disk can be rotated to move one filter unit out of the flow path and another into the flow path without interrupting the flow. The advantage of this is not only that flow can continue unabated, but that the pressure difference before and after the changeover will be nominal. Since, presuming that filters are switched at regular intervals, the filter unit that is moved out has been in service twice as long as the one remaining in service, the change in back pressure across the filter units will not change as drastically as if clogged filter units were changed with clean ones.

As a rule the filter units are generally kidney-shaped so that they can nest closely with one another on the filter disk, only separated by thin webs. The disadvantage of this construction is that the invariably circular-section passages and ports do not actually cover whole filter units, so flow through them is invariably partial. Furthermore the construction of both the filter disk and of the filter units themselves is fairly complex due to the irregular shapes of the units and the seats they must fit in. As a result the filter assembly is an expensive piece of equipment.

While it is known from the in-house publication "Siebwechseleinrichtungen zur Verarbeitung yon Thermoplasten" (sieve-changing devices for working on thermoplastics) of Machinenfabrik Joachim Kreyenborg & Co. of Munster, Germany, to have a branched passage system, in this arrangement flow is switched from one branch to the other during filter changeover. Thus flow is at least part of the time only through one filter unit, resulting in wide pressure fluctuations.

OBJECTS OF THE INVENTION

It is therefore an object of the present invention to provide an improved filter assembly for a molten plastic stream.

Another object is the provision of such an improved filter assembly for a molten plastic stream which overcomes the above-given disadvantages, that is which is of relatively simple construction and which ensures accurate flow through all of the filter units positioned in the flow stream.

A further object is to provide such an improved system whose filter units can be changed easily and a method of operating the system.

SUMMARY OF THE INVENTION

A filter assembly used in combination with an extruder producing a stream of pressurized molten plastic has according to the invention an inlet plate formed with a Y-shaped inlet passage having a substantially circular-section upstream end adapted to receive the stream of pressurized molten plastic from the extruder. The inlet passage branches downstream of its upstream end and has a pair of downstream ends opening at substantially circular downstream ports. An outlet plate is formed with a Y-shaped outlet passage having a substantially circular-section downstream end. The outlet passage is branched upstream of its downstream end and has a pair of upstream ends opening at substantially circular upstream ports aligned with the downstream ports. A rotatable filter disk engaged between the plates is formed with a circularly annular array of substantially circular-section throughgoing holes each defining a respective substantially circular seat. The ports and holes are laterally spaced from each other such that in predetermined positions of the disk the ports open into two adjacent holes. A drive displaces the disk between respective angularly offset positions in each of which two of the holes are aligned between the ports for flow through them from the upstream ports to the downstream ports. A respective substantially circular filter unit is provided in each of the holes.

Thus this arrangement uses inexpensive circular filter units each comprised of a perforated disk having an upstream face provided with a layer of filter medium. Similarly the filter disk is formed with a plurality of stepped cylindrical holes receiving the filter disks so that it can also be produced at relatively low cost. The inlet and outlet plates are formed with symmetrical passages that respectively have substantially cylindrical upstream and downstream end portions opening at the respective upstream and downstream ends. Thus these plates can also be made in a relatively simple process. Thus the filter assembly according to the invention can be of overall relatively inexpensive construction. Even so, flow through the entire usable surface areas of the filter units is certain, for efficient use of them.

According to the invention, the filter-disk holes are spaced apart by a predetermined angular distance and the upstream ports are spaced from each other by the same distance. The downstream ports are aligned with the respective upstream ports. Furthermore, the ports and filter units are of generally the same diameter and the upstream ports are spaced from each other by a distance equal to less than one-quarter of the diameter.

Thus the molten-plastic stream is not deflected too widely.

In accordance with a further feature of the invention the filter units have a thickness that is substantially less than a thickness of the filter disk and have upstream and downstream faces spaced downstream and upstream from respective upstream and downstream faces of the filter disk. The drive includes means for angularly indexing the disk through angular steps of a predetermined angular displacement corresponding to a whole-number divisor of the angular spacing between adjacent filter units in the disk. Normally this is achieved by providing the outer periphery of the disk with a number of teeth that is twice the number of filter units so that two indexing operations are needed to move a new filter into the flow path and an old filter out of it. The inlet and outlet plates only axially overlap about half of the filter disk and leave the other half of the filter disk exposed so that filter units can be serviced and worked on in the exposed half of the disk.

The filter assembly further has according to the invention means in at least one of the plates downstream in the direction from the ports for evacuating molten plastic from a filter unit downstream of the ports, and means in at least one of the plates upstream in the direction from the ports for filling molten plastic into a filter unit upstream of the ports. Thus air is not introduced into the stream when a new filter unit is inserted and when an old one is pulled out it is drained first.

The filter assembly according to the invention can be operated by normally aligning a respective one of the filter units with each of the upstream ports for flow from the upstream ports only through the two filter units aligned therewith and into the downstream ports. Alternately the filter units have a thickness that is substantially less than a thickness of the filter disk and have upstream and downstream faces spaced downstream and upstream from respective upstream and downstream faces of the filter disk in which case the assembly is operated by normally aligning three of the filter units with the upstream ports so that each of the upstream ports overlaps two of the filter units and one of the filter units receives flow from both of the upstream ports.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
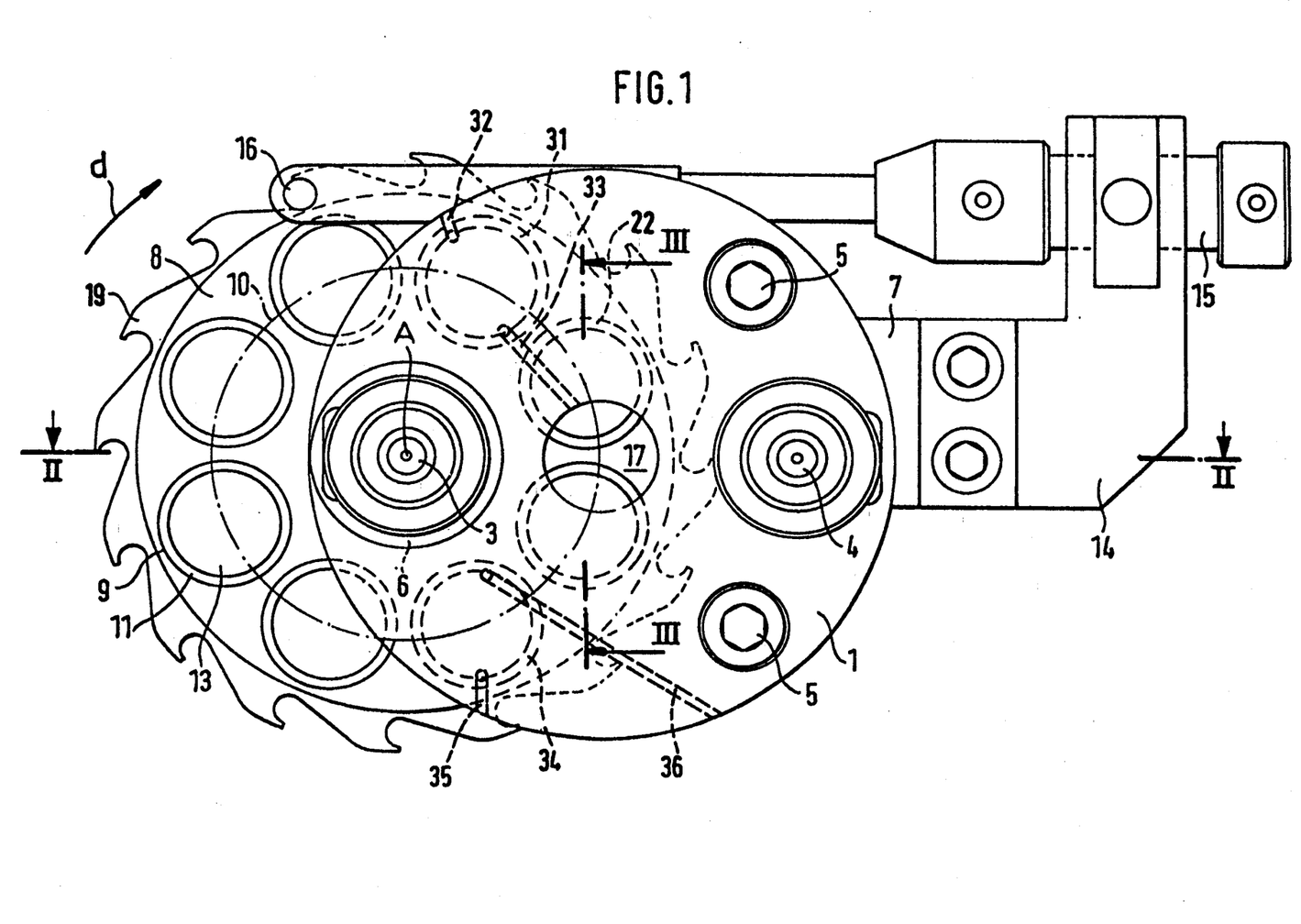
FIG. 1 is an end view of the system of this invention.
Figure 2:
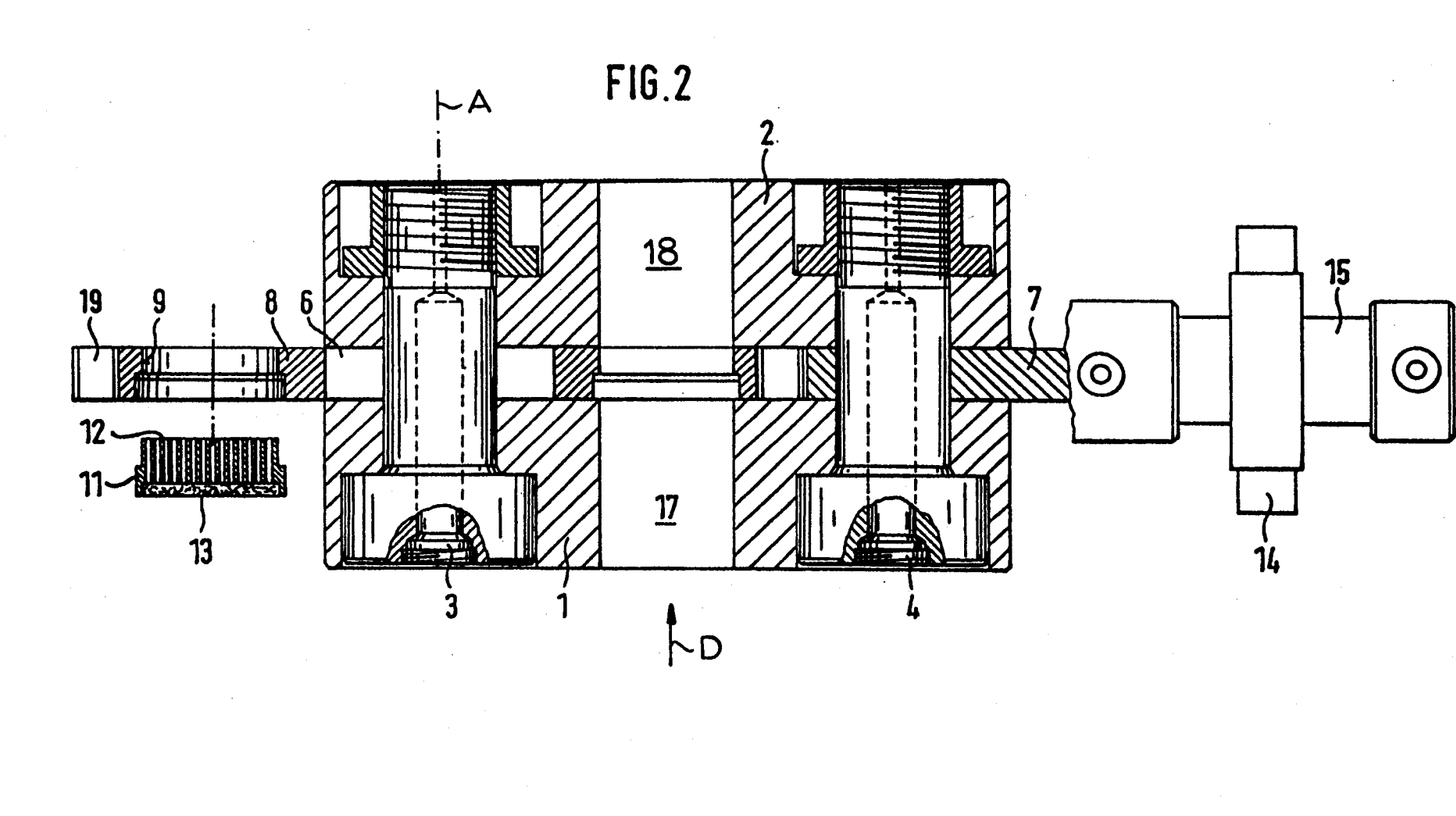
FIG. 2 is a partly diagrammatic section taken along line II—II of FIG. 1 but with the filter disk displaced angularly for clarity of view.
Figure 3:
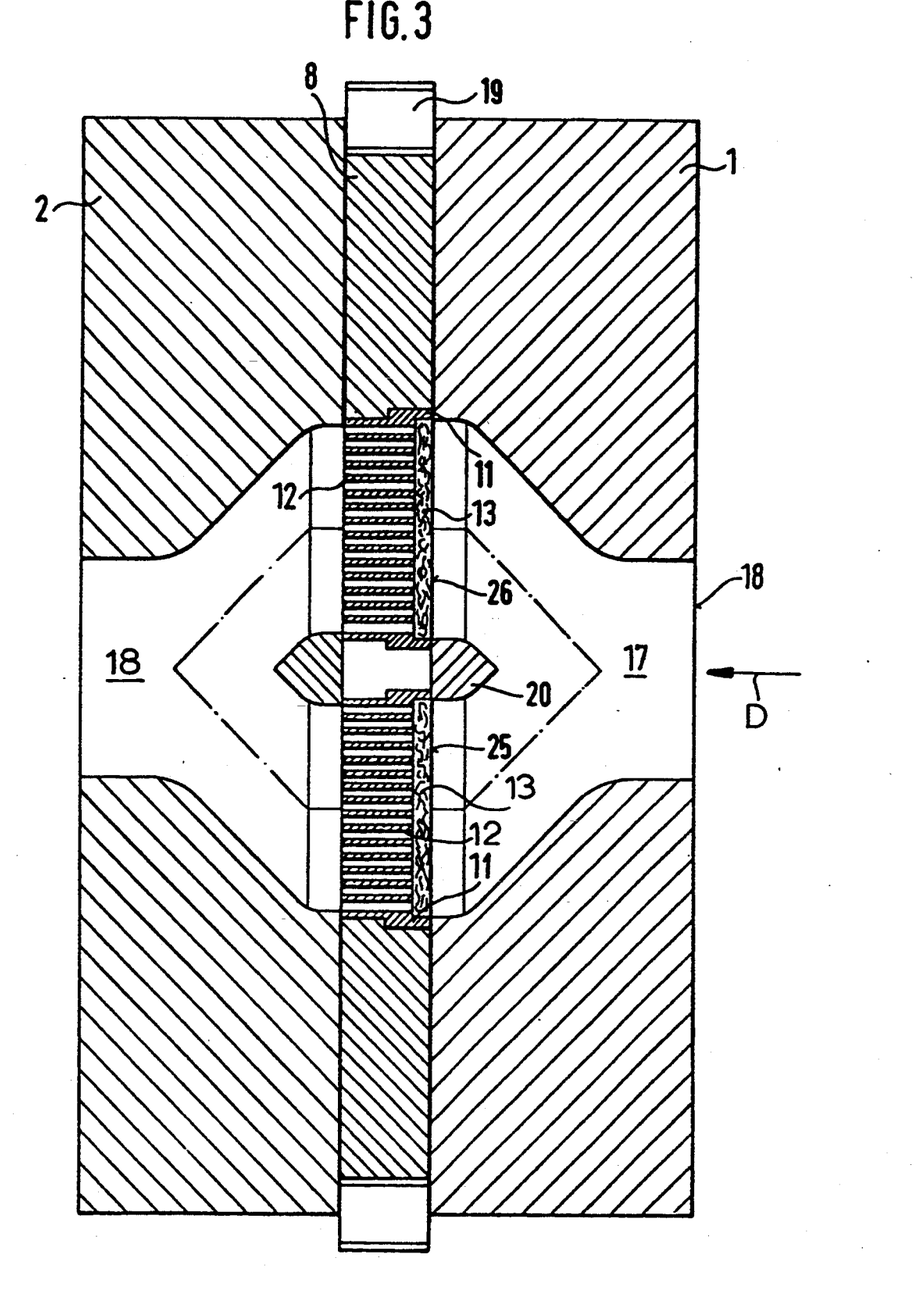
FIG. 3 is a large-scale section taken along line III—III of FIG. 1.

As seen in FIGS. 1 through 3 a pair of normally stationary plates 1 and 2 sandwich a spacer disk 6 and plate 7, with bolts 3, 4, 5 holding the elements together. A circular filter disk 8 can rotate between the plates 1 and 2 about an axis A of the disk 6 and is formed with eight axially throughgoing circular seat holes 9 angularly equispaced about the axis A and all lying on a circle 10 centered on the axis A. Each hole 9 is stepped and is adapted to receive a filter ring 11 formed on a perforated filter disk 12 having an upstream face (relative to a normal flow direction D) supporting a layer of filter medium 13.

The spacer plate 7 is formed with an extension 14 on which is mounted a double-acting hydraulic cylinder 15 whose piston rod carries an entrainment pin 16 that can catch in any of sixteen angularly equispaced entrainment teeth or hooks 19 formed on the outer periphery of the wheel 8. Thus each in-and-out actuation of the cylinder 15 will angularly index the wheel 8 through one-sixteenth of a revolution, that is half the center spacing between adjacent holes 9.

As seen in FIG. 3, the upstream plate 1 is formed with a Y-shaped intake passage 17 having a circular upstream end and branched at a dividing web 20 to have two downstream ports 25 and 26 also of circular shape. The upstream portion of the passage 17 is of cylindrical shape and then the flow cross section increases uniformly into two circular-section downstream branches each terminating at a respective one of the ports 25 and 26. The downstream plate 2 is formed with a complementarily identical outlet passage 18. All inner surfaces of the passages 17 and 18 are gently rounded and the webs 20 are very small so that the split flow moving along the passages 17 and 18 will not have to be deflected too much to the side.

Figure 4:
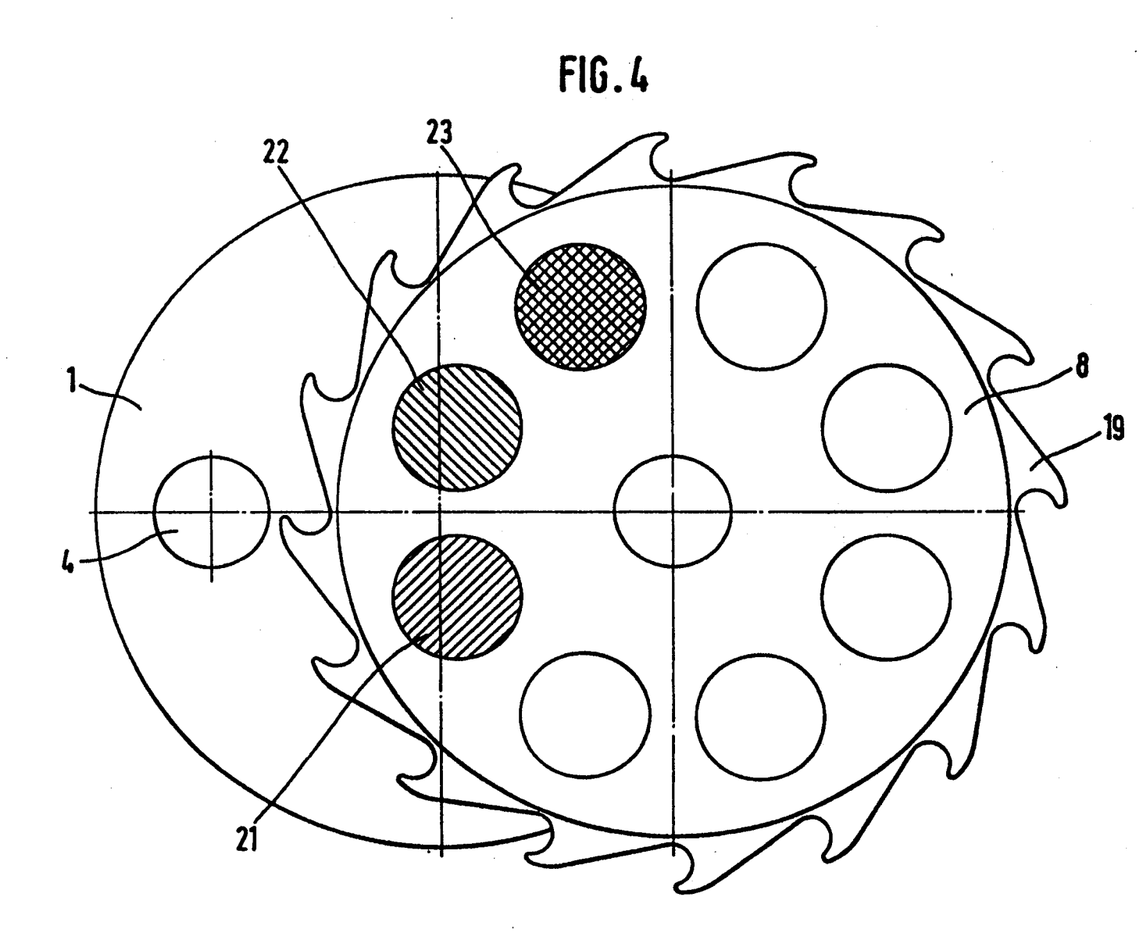
FIGS. 4 and 5 are mainly schematic end views illustrating operation of another filter assembly of this invention.
Figure 6:
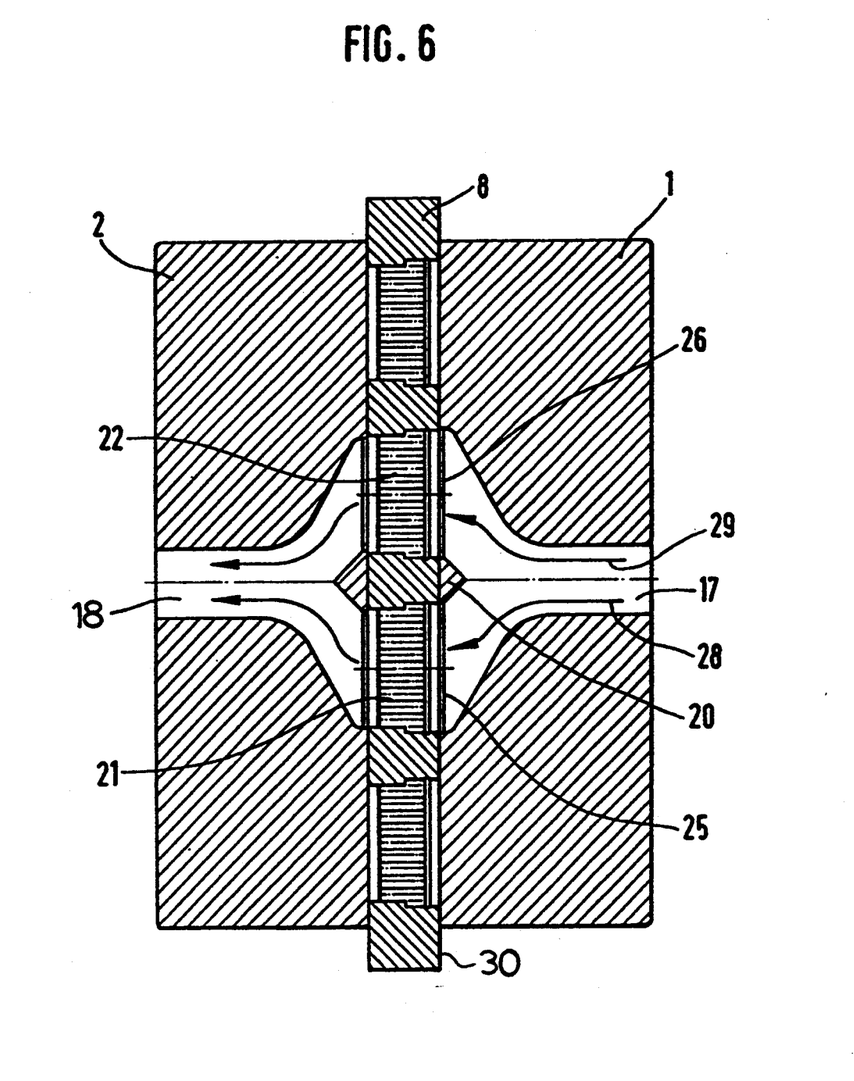
FIGS. 6 and 7 are sections like FIG. 3 showing the structure in the positions of respective FIGS. 4 and 5.

FIGS. 4 and 6 show how in one operational mode of the filter assembly of this invention two filter units shown at 21 and 22 and each comprised of the elements 11, 12, and 13 are aligned directly with the ports 25 and 26. Thus incoming flow will start out together and then split as shown by arrows 28 and 29 in FIG. 6. Downstream of the filters 21 and 22 the split flows will reunite and flow out through the passage 18. When the filter 21 starts becoming excessively clogged, the actuator 15 is operated twice to move the unit 21 out of the flow path, to advance the unit 22 to alignment with the port 25, and to move the next unit 23 into alignment with the port 26.

Figure 5:
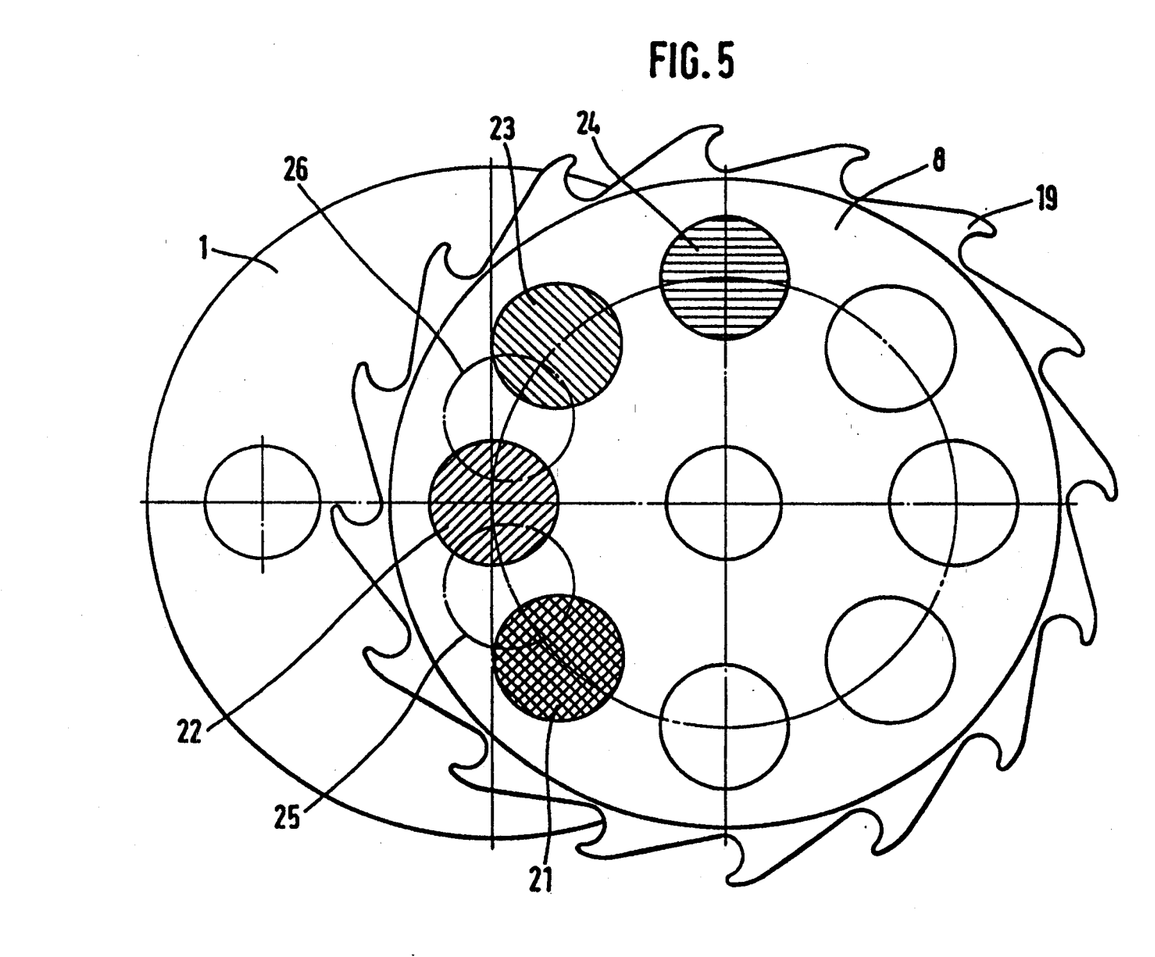
Figure 7:
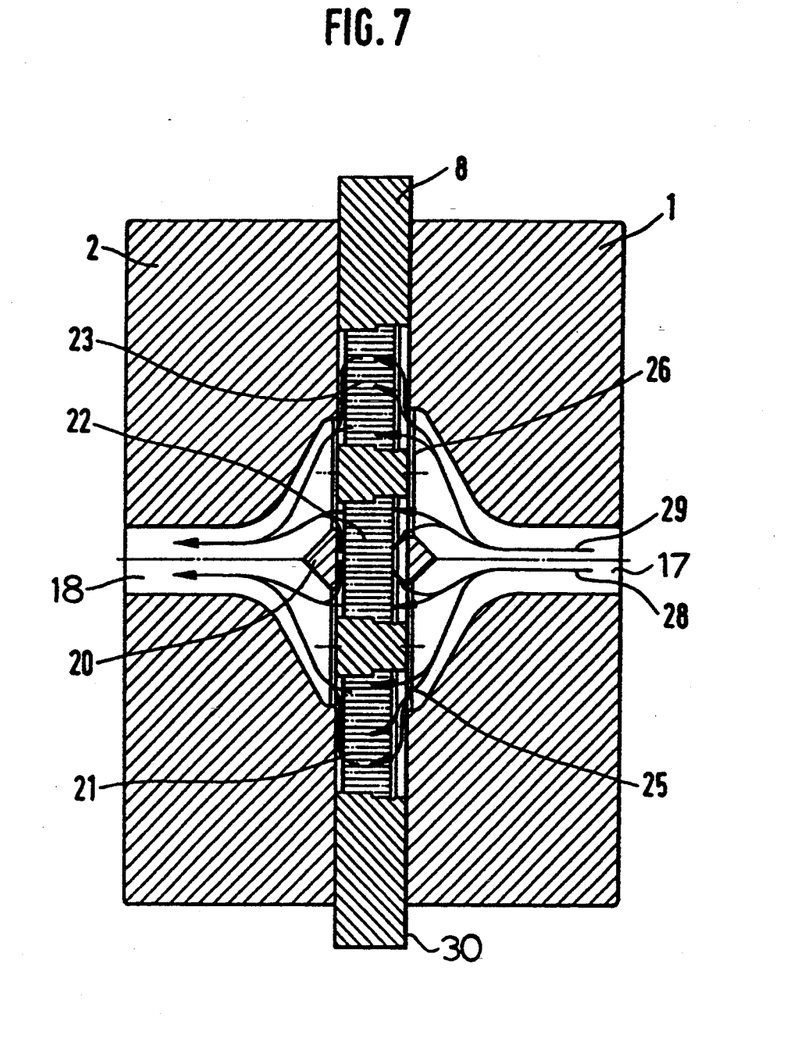

Alternately as shown in FIGS. 5 and 7 the three units 21, 22, and 23 can be set to align with the two ports 25 and 26. In this case as is clearly illustrated the upstream faces of all the filter units are recessed somewhat downstream of an upstream face 30 of the filter plate 8, so that flow will pass through all three of the plates as indicated by arrows 28 and 29. Changeover is done here as in the arrangement of FIGS. 4 and 6 by two indexings of the cylinder 15 to bring into action another unit 24 and take out the unit 21. The advantage of this system is that only one of three filter units is being changed at any one time, so that the pressure change as filter units are changed is minimized. In addition during normal operation the total surface area of three units is available for the stream of resin, greatly reducing the resistance to flow through the filter.

FIG. 1 illustrates how the plates 1 and 2 are formed upstream relative to a normal rotation direction d of the disk 8 with a bottom fill port 32 and a top vent port 33, both opening into a region 31 where the next filter unit to be used will be. Thus this filter can be filled with molten plastic before being brought into use to prevent introduction of air into the flow as described in my copending application Ser. No. 08/050,914 filed 20 Apr. 1993. In addition a downstream location 34 is provided with a bottom drain passage 35 and a top blowout line 36 connected to a source of compressed air for draining out the liquid in a filter taken out of service. Thus when the filters reach the service/exchange location outside of the device, where two full filters are exposed, they are empty.

I claim:

1. A method of operating a filter assembly used in combination with an extruder producing a stream of pressurized molten plastic, the filter assembly comprising:
   an inlet plate formed with a Y-shaped inlet passage having a substantially circular-section upstream end adapted to receive the stream of pressurized molten plastic from the extruder, the inlet passage branching downstream of its upstream end and having a pair of downstream ends opening at substantially circular downstream ports;
   an outlet plate fixed and spaced downstream of the inlet plate and formed with a Y-shaped outlet passage having a substantially circular-section downstream end, the outlet passage being branched upstream of its downstream end and having a pair of upstream ends opening at substantially circular upstream ports aligned with the downstream ports;
   a rotatable filter disk engaged between the plates and formed with a circularly annular array of substantially circular-section throughgoing holes each defining a respective substantially circular seat, the ports and holes being laterally spaced from each other such that in predetermined positions of the disk the ports open into two adjacent holes;
   drive means for displacing the disk between respective angularly offset positions in each of which two of the holes are aligned between the ports for flow through them from the upstream ports to the downstream ports; and
   a respective substantially circular filter unit in each of the holes, the method comprising the steps of:
   aligning a respective one of the filter units with each of the upstream ports for flow from the upstream ports only through the two filter units aligned therewith and into the downstream ports.

2. A method of operating a filter assembly used in combination with an extruder producing a stream of pressurized molten plastic, the filter assembly comprising:
   an inlet plate formed with a Y-shaped inlet passage having a substantially circular-section upstream end adapted to receive the stream of pressurized molten plastic from the extruder, the inlet passage branching downstream of its upstream end and having a pair of downstream ends opening at substantially circular downstream ports;
   an outlet plate fixed and spaced downstream of the inlet plate and formed with a Y-shaped outlet passage having a substantially circular-section downstream end, the outlet passage being branched upstream of its downstream end and having a pair of upstream ends opening at substantially circular upstream ports aligned with the downstream ports;
   a rotatable filter disk engaged between the plates and formed with a circularly annular array of substantially circular-section throughgoing holes each defining a respective substantially circular seat, the ports and holes being laterally spaced from each other such that in predetermined positions of the disk the ports open into two adjacent holes;
   drive means for displacing the disk between respective angularly offset positions in each of which two of the holes are aligned between the ports for flow through them from the upstream ports to the downstream ports; and
   a respective substantially circular filter unit in each of the holes having a thickness that is substantially less than a thickness of the filter disk and having upstream and downstream faces spaced downstream and upstream from respective upstream and downstream faces of the filter disk, the method including the step of:
   aligning three of the filter units with the upstream ports so that each of the upstream ports overlaps two of the filter units and one of the filter units receives flow from both of the upstream ports.

* * * * *